April 14, 1931.    G. J. KOCH    1,800,298
MATERIAL SPREADER
Filed April 14, 1928    2 Sheets-Sheet 2
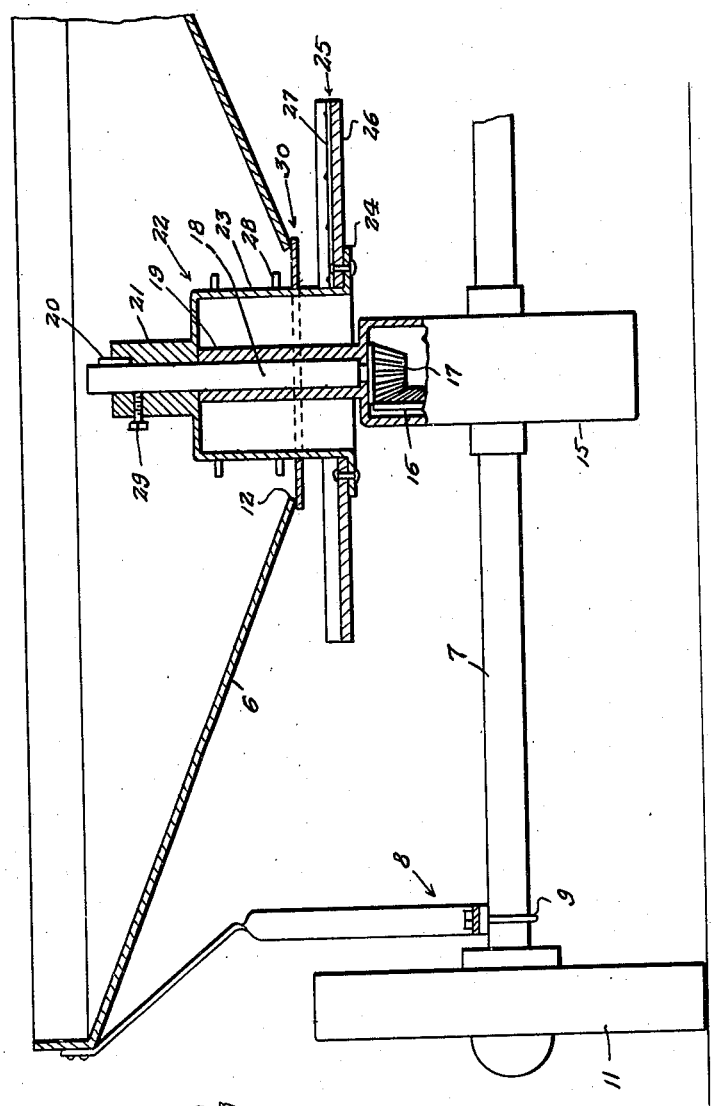
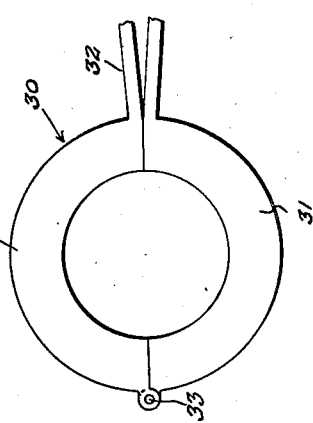
Inventor
*G. J. Koch,*
By *Clarence A. O'Brien*
    *Attorney*

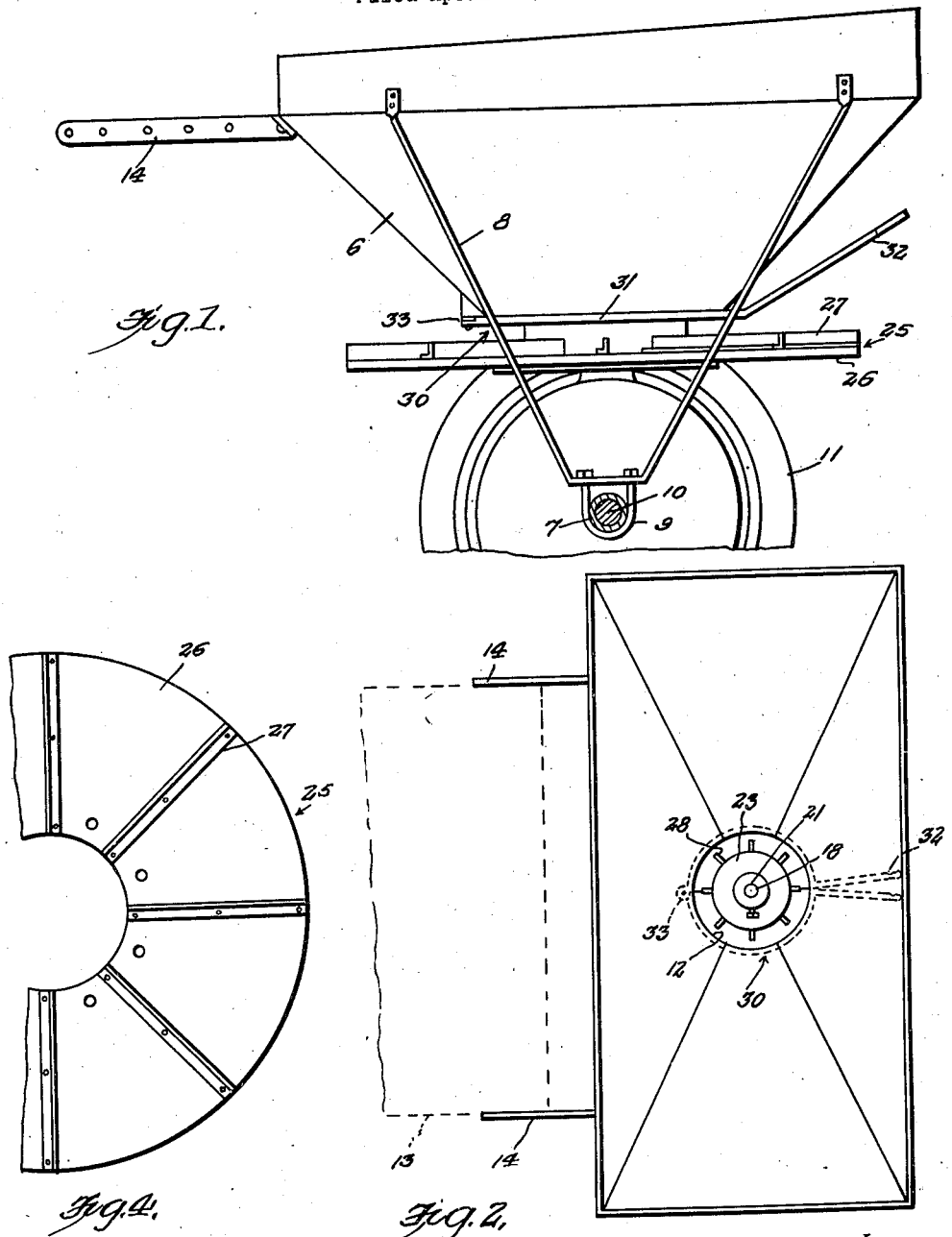

Patented Apr. 14, 1931

1,800,298

UNITED STATES PATENT OFFICE

GUSTAV JULUS KOCH, OF LA CROSSE, WISCONSIN

MATERIAL SPREADER

Application filed April 14, 1928. Serial No. 270,085.

This invention relates to an improved wheel supported material spreader such as is adapted to be attached to and propelled by an appropriate draft appliance.

More specifically, the invention has reference to a hopper, means for connecting the hopper with the draft appliance, a reel supported axle, rotatable distributing and setting means, and a control valve associated with said means and said hopper.

What I propose is a structure of this class which is characterized by a novel arrangement of cooperating parts functioning in a manner to produce a novel organization such as will properly fulfill the requirement of a device of this class, for spreading sand, gravel, manure, fertilizer or the like.

In the drawings:

Figure 1 is a side elevational view with a portion in section of a complete structure.

Figure 2 is a top plan view thereof.

Figure 3 is an enlarged fragmentary sectional and elevational view, showing the association of parts more plainly.

Figure 4 is a top plan view of the spreader and distributing table, per se.

Figure 5 is a top plan view of the sectional regulating valve which cooperates with the discharge end of the hopper.

Attention is invited to Figure 3, wherein it will be observed that 6 designates the hopper which is adapted to contain the material to be spread. This may be of tapered rectangular configuration as shown in Figure 2 or in any other appropriate shape. It is supported from the axle housing 7 through the medium of appropriate supporting brackets 8 attached to the axle housing by clamps 9. Located in the axle housing is the axle 10, (see Figure 1), with which the traction and driving wheels 11 are connected. The hopper is provided with a relatively large discharge opening 12, and is adapted to be attached to the draft appliance 13, by way of suitable attaching straps, or their equivalent 14, (see Figure 2).

Referring again to Figure 3, it will be observed that 15 designates a gear casing comprising a bevelled driving gear 16, in mesh with a pinion 17 in the lower end of an upstanding driven shaft 18. This shaft is rotatable in the upstanding bearing 19 forming a part of the gear casing or housing. It will be noted that the shaft extends a considerable distance above the bearing where it is keyed as at 20 to the collar portion 21, of the hub structure 22. The hub structure includes an enlarged cupped portion 23 surrounding the bearing and shaft and provided at its bottom with an outstanding circular flange 24, on which distributing and spreader means 25 is mounted. This table is in the form of an annulus 26 fastened to the flange 24 and provided with radial circumferentially spaced distributing ribs 27.

It is to be noted, too, that the parts 43 is equipped with an appropriate number of agitating fingers 28. Moreover, the collar 21 carries a set screw 29, which is fastened to the shaft 18.

Attention is now directed to the regulating valve 30, which is shown at Figure 5 and comprises a pair of semi-circular sections 31, equipped with operating handles 32 and pivotally connected together and connected with the hopper, as at 33. This valve embraces that portion of the hook structure which extends into the interior of the central part of the hopper and permits the material passing through the discharge opening to be regulated at the will of the operator.

From the foregoing description, it will be seen that I have evolved and produced a novel structure, including a wheel supported axle geared to a rotating hub structure carrying a spreading and distributing annulus or table, these parts cooperating with the hopper, supported from the axle housing and the regulating valve, whereby the material may be controlled according to the demand. A structure of this class is particularly advantageous for spreading and distributing sand and gravel for road work, or it may be used in the field for distributing fertilizer material, manure, and the like.

The simplicity of construction and arrangement, however, is such as to permit a clear understanding to be had, after considering the description in connection with the drawings.

Consequently a more lengthy description is regarded unnecessary.

Minor changes in the shape, size and arrangement of parts coming within the field of invention claimed may be resorted to if desired.

Having thus described my invention, what I claim as new is:

In a structure of the class described, a wheel supported and rotated axle, a hopper supported in spaced relation above the axle, said hopper having a centralized discharge opening in its bottom, a gear casing on the axle and including an upstanding bearing extending through said discharge opening, a gear mounted on the axle within the gear casing, a shaft mounted for rotation in said bearing, a pinion on the lower end of said shaft adapted to mesh with the gear in said casing, a hub structure connected for rotation to said shaft and resting upon said bearing, the lower portion of said hub structure extending down through and beyond the discharge opening in the hopper and being provided with an outstanding flange, an annular table carried by said flange, radial circumferentially spaced distributing ribs mounted on the upper side of said table and a regulating valve for the discharge opening carried by said hub structure and comprising a pair of semi-circular sections cooperating to surround said structure, and each of said sections being provided with operating handles for manually operating the sections.

In testimony whereof I affix my signature.

GUSTAV JULUS KOCH.